W. M. BAKER.
Refrigerator.
No. 310. A. 1. Patented Jan. 15, 1861.
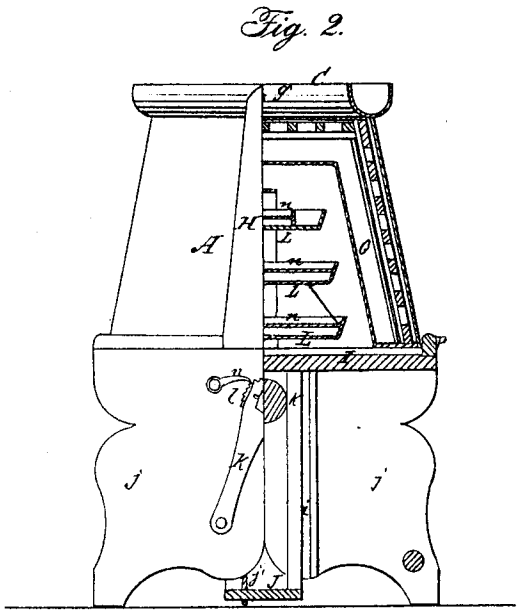
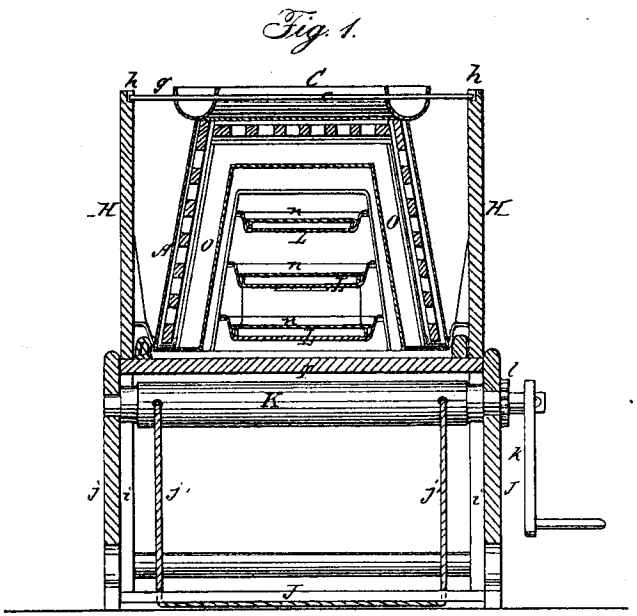
Witnesses:
Holcombs.
R. S. Spencer.
Inventor:
W. M. Baker.
per Munn & Co.
Attorneys.
AM. PHOTO-LITHO. CO. N.Y. (OSBORNE'S PROCESS.)

DEPARTMENT OF COMMERCE
UNITED STATES PATENT AND TRADEMARK OFFICE

---

MISSING PAGE(S)

PATENT NUMBER AI 310 FOR THE ISSUE DATE 01/15/1861 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims